United States Patent
Abdelrahman et al.

(10) Patent No.: US 11,725,532 B1
(45) Date of Patent: Aug. 15, 2023

(54) SWITCHING VALVE

(71) Applicant: PRATT & WHITNEY CANADA CORP., Longueuil (CA)

(72) Inventors: Ahmed Abdelrahman, Mississauga (CA); Michel Pitsikoulis, Laval (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/804,580

(22) Filed: May 30, 2022

(51) Int. Cl.
*F01D 17/14* (2006.01)
*F01D 25/28* (2006.01)

(52) U.S. Cl.
CPC ........... *F01D 17/145* (2013.01); *F01D 25/28* (2013.01); *F05D 2230/232* (2013.01); *F05D 2240/58* (2013.01); *F05D 2260/36* (2013.01); *F05D 2260/37* (2013.01); *F05D 2260/606* (2013.01)

(58) Field of Classification Search
CPC .. F04D 15/0011; F04D 27/009; F04D 11/005; F04D 17/145; F05D 2240/58; F16K 17/065
See application file for complete search history.

(56) References Cited

U.S. PATENT DOCUMENTS

| | | | |
|---|---|---|---|
| 2,931,673 A | 4/1960 | Gondek | |
| 4,830,331 A | 5/1989 | Vindum | |
| 4,941,502 A * | 7/1990 | Loos | F04D 15/0011 |
| | | | 137/115.06 |
| 6,122,905 A | 9/2000 | Liu | |
| 6,698,446 B2 * | 3/2004 | Cornwell | F04B 49/035 |
| | | | 137/115.15 |
| 8,272,858 B2 | 9/2012 | Bollwerk et al. | |
| 8,544,816 B2 * | 10/2013 | Bielass | F16K 39/022 |
| | | | 251/50 |
| 10,001,060 B2 * | 6/2018 | Faubert | F16K 31/12 |
| 10,883,616 B2 | 1/2021 | Stanhope | |
| 2010/0092116 A1 | 4/2010 | Franconi | |
| 2015/0089939 A1 | 4/2015 | Lafiandra et al. | |
| 2017/0356348 A1 | 12/2017 | Ribarov et al. | |
| 2020/0032806 A1 * | 1/2020 | Franconi | F04D 27/0215 |
| 2021/0025400 A1 * | 1/2021 | Sinico | F04B 53/1032 |

* cited by examiner

*Primary Examiner* — Sabbir Hasan
*Assistant Examiner* — Jackson N Gillenwaters
(74) *Attorney, Agent, or Firm* — Norton Rose Fulbright Canada LLP

(57) ABSTRACT

A valve for an air system in an aircraft engine, comprising: a housing defining a chamber having a valve axis circumscribed by a sealing surface; and a piston assembly within the chamber including: a sealing ring; and a body extending annularly about a piston axis collinear with the valve axis, having a first and a second piston surface axially spaced apart, a radially outer piston surface extending axially and located between the first and second piston surfaces, and an annular groove extending radially inwardly from the radially outer piston surface having first and second groove walls spaced apart and axially facing one another, the sealing ring within the annular groove, the body including: a first member defining the first piston surface and the first groove wall; and a second member defining the second piston surface and the second groove wall, the first member and the second member in mating engagement.

18 Claims, 6 Drawing Sheets

SWITCHING VALVE

TECHNICAL FIELD

The disclosure relates generally to aircraft engines and, more particularly, to bleed air valves for such engines.

BACKGROUND

In most aircraft engines, secondary air systems employ pressurized air from the engine compressor for sealing bearing cavities, assisting in engine oil scavenging, providing internal engine cooling and cabin pressurization, among other uses. Depending on engine operation, air may be bled at different stages of the compressor for use in the secondary air system. Switching valves can be used to govern this air intake. Typically, in such valves, a spring-mounted piston is slidably received in a sleeve, and a sealing ring is used to form a seal between the piston and the sleeve. Switching valve components are manufactured from suitable materials. Nonetheless, wear may occur at sealing interfaces.

SUMMARY

According to an aspect of the present technology, there is provided a valve for an air system in an aircraft engine, comprising: a piston housing defining a cylindrical chamber having a valve axis, the cylindrical chamber circumscribed by a sealing surface; and a piston assembly received within the chamber, the piston assembly including: a sealing ring; and a piston body extending annularly about a piston axis collinear with the valve axis, the piston body having a first axial piston surface and a second axial piston surface axially spaced apart, a radially outer piston surface extending axially and located between the first and second axial piston surfaces, and an annular groove extending radially inwardly from the radially outer piston surface, the annular groove having first and second axial groove walls spaced apart and axially facing one another, the sealing ring received within the annular groove, the piston body including: a first member defining the first axial piston surface and the first axial groove wall; and a second member defining the second axial piston surface and the second axial groove wall, the first member and the second member in mating engagement with one another.

In another aspect, there is provided an aircraft engine comprising: a compressor including an intercompressor case defining a cylindrical chamber about a chamber axis, the chamber circumscribed by a sealing surface; and a piston assembly received within the chamber, including: a sealing ring conformable to the sealing surface; and a piston body about a piston axis, the piston body having a first axial piston surface and a second axial piston surface facing axially opposite one another relative to the piston axis, a radially outer piston surface circumscribed by a piston diameter smaller than the sealing diameter, the radially outer piston surface extending axially between the first and second axial piston surfaces, and an annular groove extending radially inwardly from the radially outer piston surface and having first and second axial groove walls facing axially one another, the sealing ring received by the annular groove, the piston body including: a first member defining the first axial piston surface and the first axial groove wall; and a second member defining the second axial piston surface and the second axial groove wall, the first and the second members matingly engaged with one another.

BRIEF DESCRIPTION OF THE DRAWINGS

Reference is now made to the accompanying figures in which.

DETAILED DESCRIPTION

Figure 1:
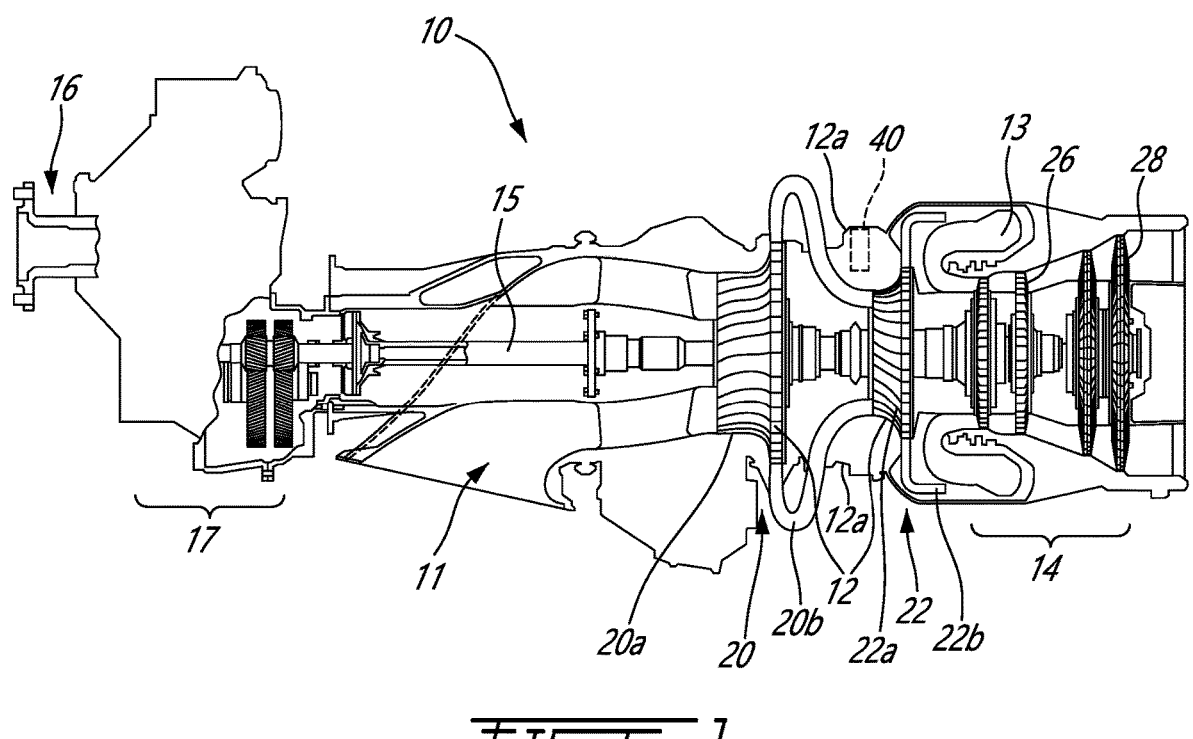
FIG. 1 is a schematic cross-sectional view of an aircraft engine.

FIG. 1 illustrates an aircraft engine 10, such as a gas turbine engine, of a type preferably provided for use in subsonic flight, generally comprising in serial flow communication an air intake 11 through which air is drawn, a compressor section 12 within which the air is compressed, a combustor 13 in which the compressed air is mixed with fuel and ignited for generating an annular stream of hot combustion gases, and a turbine section 14 for extracting energy from the combustion gases.

The aircraft engine 10 of FIG. 1 is a turboprop engine, and therefore includes a power output shaft 15 connected to and driven by one or more of the turbines from the turbine section 14 to transmit a driving force to a propeller of the aircraft via a reduction gearbox 17 driving a propeller output flange 16. While an airborne turboprop engine 10 is shown in FIG. 1, it is to be understood that the present disclose equally applies to other types of aircraft engines, including for example turboshaft engines in some cases for non-airborne applications.

In the embodiment of FIG. 1, the turbine section 14 of the aircraft engine 10 includes two sets of turbines, namely compressor turbine(s) 26 and power turbine(s) 28. The compressor turbine(s) 26 drive the compressor rotors of the compressor section 12, and are therefore mounted to a common core engine shaft 29. The power turbine(s) 28 are mounted to the power output shaft 15, which is coaxial and concentric with the core engine shaft 29, which drives the reduction gearbox 17 and ultimately the output propeller flange 16.

As can be appreciated from FIG. 1, the compressor section 12 of the aircraft engine 10 is a multi-stage compressor and includes two centrifugal compressors, namely a first, upstream, centrifugal compressor 20 and a second, downstream, centrifugal compressor 22. The upstream centrifugal compressor 20 will be referred to herein as the low pressure (LP) compressor 20, and the downstream centrifugal compressor 22 will be referred to herein as the high pressure (HP) compressor 22. These two compressors 20 and 22 are disposed adjacent to one another and in succession within a main flow path of the engine 10 of the compressor section 12, such that they are in serial flow communication without any intervening compressor stages (e.g. axial compressors) therebetween. A primary airflow occurring in the main flow path of the engine 10 is drawn into the intake 11, directed into the LP compressor 20 for compression, directed into the HP compressor 22 for further compression, and directed into the combustor 13 for combustion.

Each of the compressors 20, 22 includes an impeller and a diffuser downstream therefrom. Although vane diffusers may also be used, in the depicted embodiment both of the compressors 20 and 22 employ diffuser pipes downstream from their respective impellers. More particularly, the LP compressor 20 includes an LP impeller 20a and LP diffuser pipes 20b which receive the compressed air exiting the LP impeller 20a. The HP compressor 22 includes an HP impeller 22a and HP diffuser pipes 22b which receive the compressed air exiting the HP impeller 22a and direct it to the combustor 13 downstream. The compressor section 12 also includes an intercompressor case 12a located axially between the impellers 20a, 22a of the LP and HP compressors 20, 22.

Secondary airflows also occur in the engine 10, and are bled, or taken, from suitable locations of the main flow path in order to provide suitable pressure or cooling to engine components located remotely from the main flow path. For instance, pressurized air may be bled from various sources, for example the low pressure compressor 20 and/or the high pressure compressor 22, to seal bearing cavities, to assist oil scavenging, to cool the engine 10, and to drive aircraft systems such as aircraft pneumatic, air conditioning, and/or de-icing systems, to name a few. Bleed air may be routed to a desired location via flow path(s) defined by suitable pneumatic means including air line(s), passage(s), tube(s) and valve(s) such as an air switching valve 40, referred to henceforth as the valve 40. In embodiments, the valve 40 is connected to the intercompressor case 12a, and is adapted to govern whether air provided downstream of the valve 40 is taken from the LP compressor 20 or the HP compressor 22.

Figure 2:
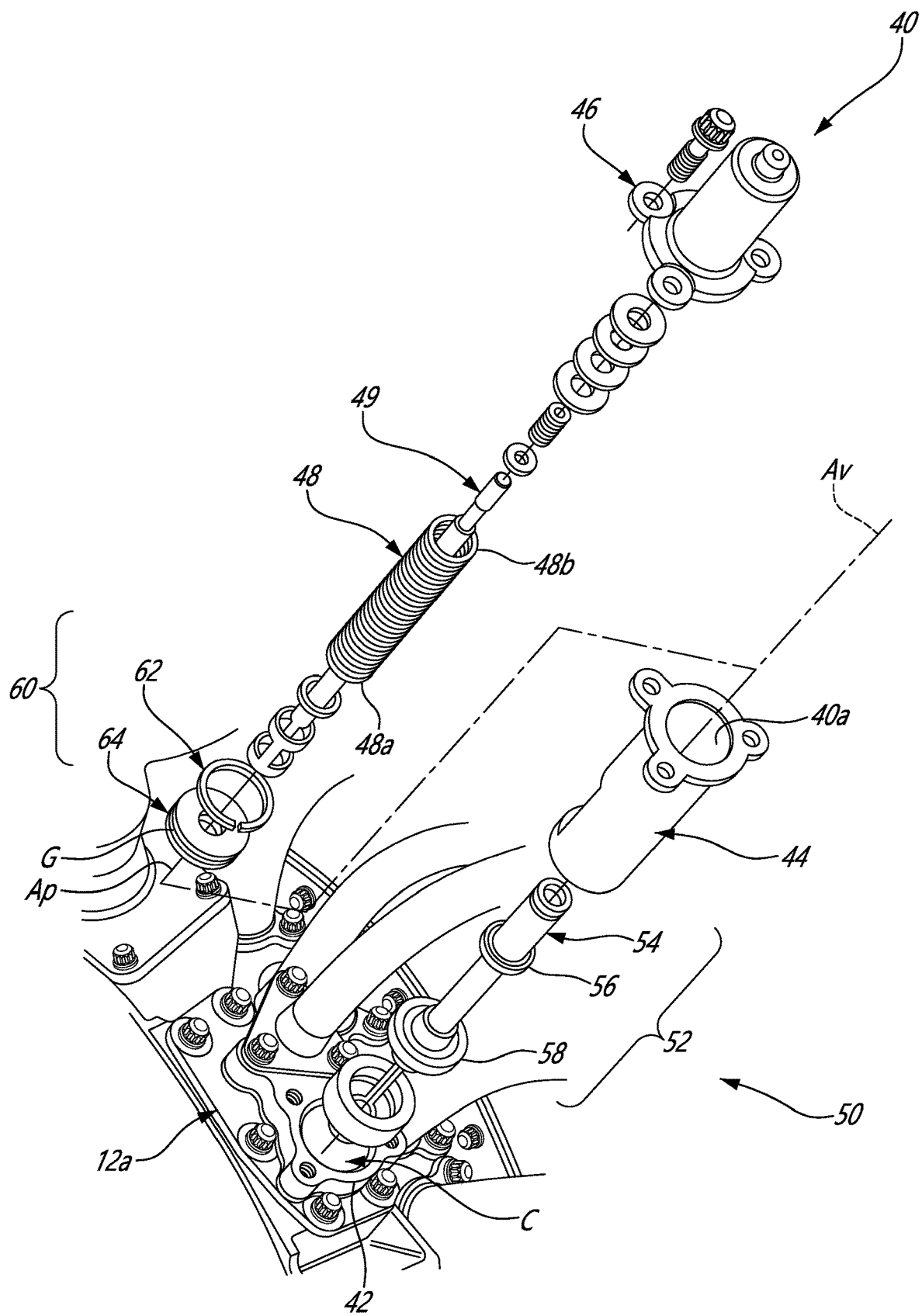
FIG. 2 is an exploded view of a valve of the aircraft engine of FIG. 1.
Figure 3:
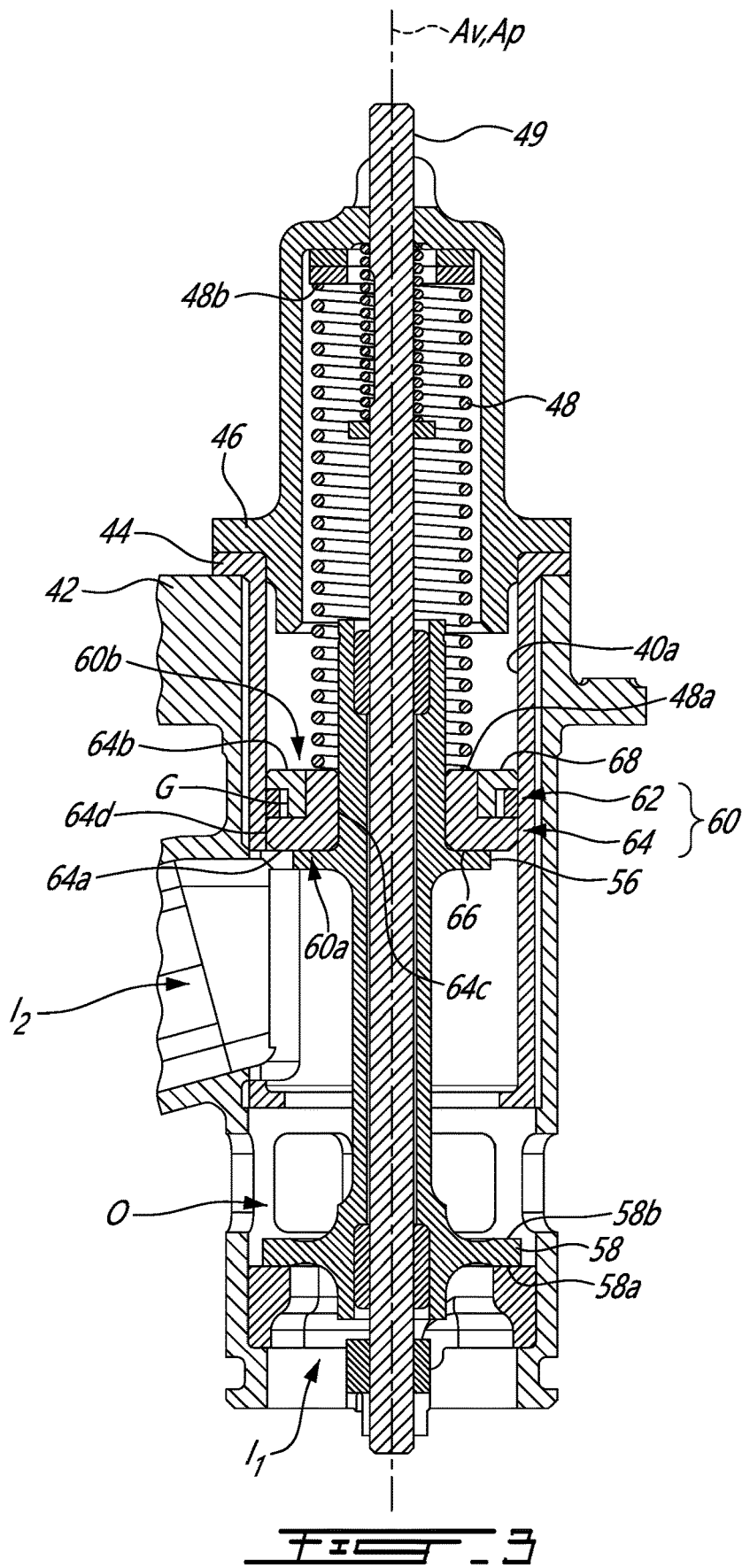
FIG. 3 is a cross-sectional view of the valve of FIG. 2.

Referring to FIGS. 2 and 3, the valve 40 will now be generally described. The valve 40 includes a hollow outer housing 42 defining a cylindrical chamber C about a valve axis $A_V$ (also referred to as a chamber axis). The outer housing 42 defines a first inlet $I_1$ in fluid communication with the HP compressor 22, a second inlet $I_2$ in fluid communication with the LP compressor 20, and an outlet O (FIG. 3) respectively in fluid communication with the chamber C. The first inlet $I_1$, the second inlet $I_2$, and the outlet O are openings that are located at an end of the chamber C that may be referred to as an open end.

The outer housing 42 is in this embodiment integral to the intercompressor case 12a, although the outer housing 42 may be a distinct part assembled to a case or other engine structure in some embodiments. The valve 40 may also include an inner housing 44 received by the outer housing 42 so as to line the chamber C. Here, a cylindrical valve sealing surface 40a of the valve 40 corresponds to a radially inner surface of the inner housing 44. In some embodiments, the inner housing 44 is omitted, in which case the valve sealing surface 40a corresponds to a radially inner surface of the outer housing 42. The valve sealing surface 40a defines a sealing diameter circumscribing the chamber C. The valve 40 also includes a hollow cover 46 connected to the outer housing 42 (in this case via a flange of the inner housing 44) about the valve axis $A_V$ so as to define a closed end of the chamber C spaced axially from the open end relative to the valve axis $A_V$. A spring 48 of the valve 40 extends along the valve axis $A_V$ inside the chamber C and from a first spring end 48a to an opposite, second spring end 48b lodged inside the cover 46. A shuttle assembly 50 of the valve 40 is received in the chamber C and extends along the valve axis $A_V$, engaging the spring 48 at the first spring end 48a. A guide pin 49 of the valve 40 extends along the valve axis $A_V$ between a first pin end held by the outer housing 42 at a bottom of the chamber C and a second pin end held by the cover 46. The guide pin 49 extends through the shuttle assembly 50 in sliding engagement therewith, rendering the shuttle assembly 50 slidably movable along the valve axis $A_V$ inside the chamber C. The shuttle assembly 50 is movable in the chamber C along the valve axis $A_V$ between a first shuttle position and a second shuttle position. In the first shuttle position, the shuttle assembly 50 obstructs the first inlet $I_1$ and fluid communication between the second inlet $I_2$ and the outlet O via the chamber C is open, i.e., unhindered by the shuttle assembly 50. In the second shuttle position, the shuttle assembly 50 obstructs the second inlet $I_2$ and fluid communication between the first inlet $I_1$ and the outlet O via the chamber C is open, i.e., unhindered by the shuttle assembly 50. The shuttle assembly 50 is operatively connected to the spring 48 to be biased by the spring 48 toward the first shuttle position.

During initial start-up of the engine 10, air from the HP compressor 22 may be the only pressurized air available, in which case the shuttle assembly 50 is in the first shuttle position. HP compressor 22 air flows, for example via a transfer tube, through the housing 42 and into the chamber C via the first inlet $I_1$. From the chamber C, the air exits via the outlet O, passes through a cavity in the intercompressor case 12a, to be supplied to its destination via suitable external lines. As the LP compressor 20 pressure increases (NH<40-45%), it overcomes the biasing force of the spring 48 to move the shuttle assembly 50 to the second shuttle position, thereby interrupting the flow of HP compressor 22 air via the outlet O and replacing it with a flow of LP compressor 20 air. Generally stated, the valve 40 acts as a switch between air sources (hence the expression "switching valve") governing from which source the air is to be bled depending on the operation regime of the engine 10.

The shuttle assembly 50 includes a shuttle 52 having a stem 54 and a flange 56 projecting radially outwardly from the stem 54. The shuttle 52 also has a blocking feature 58 spaced axially relative to the flange 56 and shaped complementarily to an inner wall of the valve 40 defining the chamber C to cooperate therewith such that fluid communication between the first inlet $I_1$ or the second inlet $I_2$ and the chamber C is blocked depending on the position of the shuttle assembly 50. In the depicted embodiment, the blocking feature 58 has a flange-like shape projecting radially outwardly from the stem 54, having a first sealing surface 58a, for example an axial surface, for sealing the first inlet $I_1$, and a second sealing surface 58b, for example an axial surface, for sealing the second inlet $I_2$.

The shuttle assembly 50 also includes a piston assembly 60 extending about a piston axis $A_P$. The piston assembly 60 is received by the chamber C such that the piston axis $A_P$ and the valve axis $A_V$ are colinear. The piston assembly 60 has opposite axial sides, namely a high-pressure side 60a laid against the flange 56 and a low-pressure side 60b laid against the spring 48. The shuttle assembly 50 thus engages the spring 48 via the low-pressure side 60b of the piston assembly 60.

The piston assembly 60 generally includes a sealing ring 62 and a disc-like piston body 64 surrounded by the sealing ring 62. As will be described hereinbelow, the piston body 64 is formed of a plurality of annular matingly engaged members 66, 68 together defining an annular groove G into which the sealing ring 62 is lodged to be axially constrained, or held.

Figure 4:
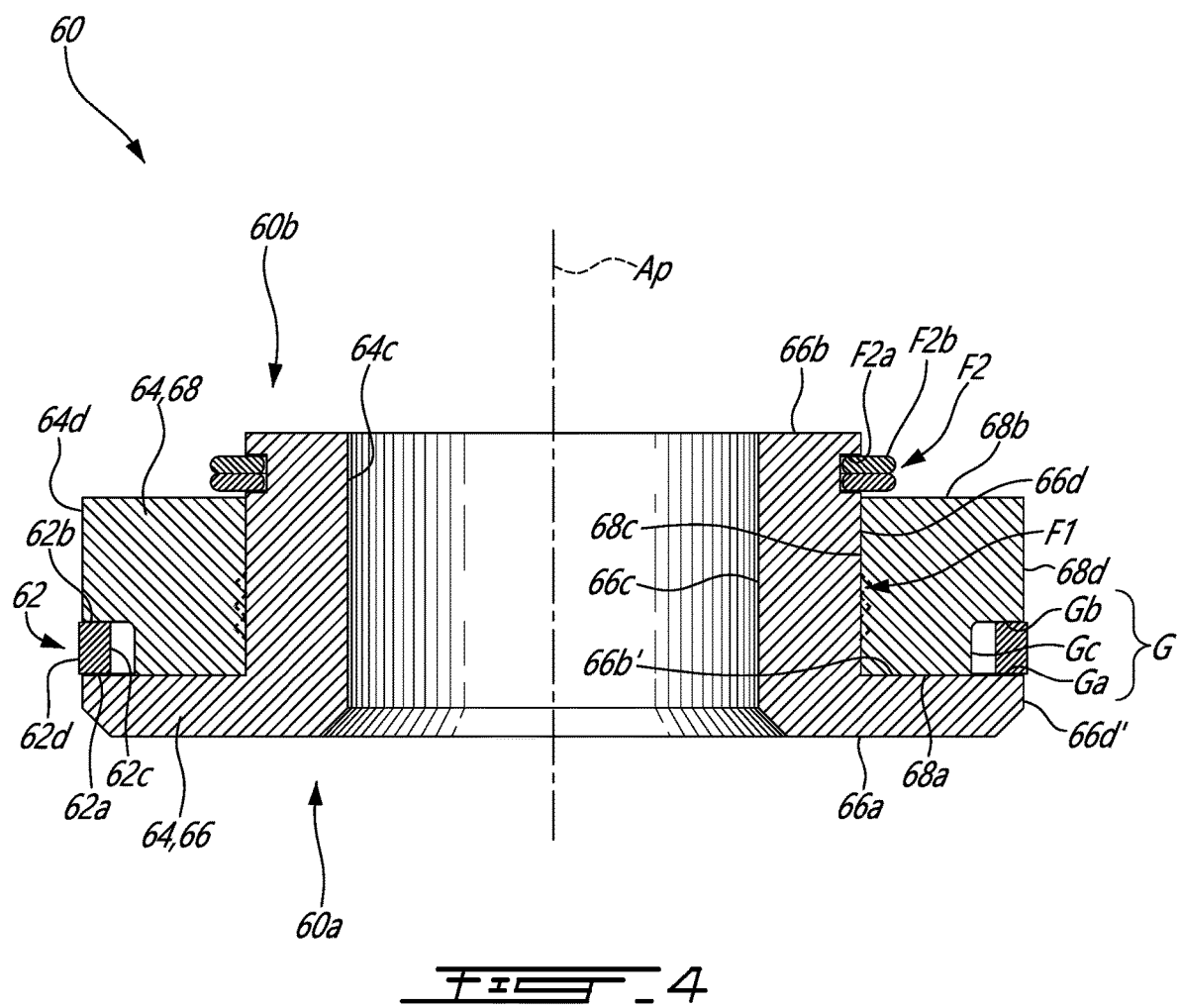
FIG. 4 is a cross-sectional view of a piston assembly of the valve of FIG. 2 according to embodiments.
Figure 5:
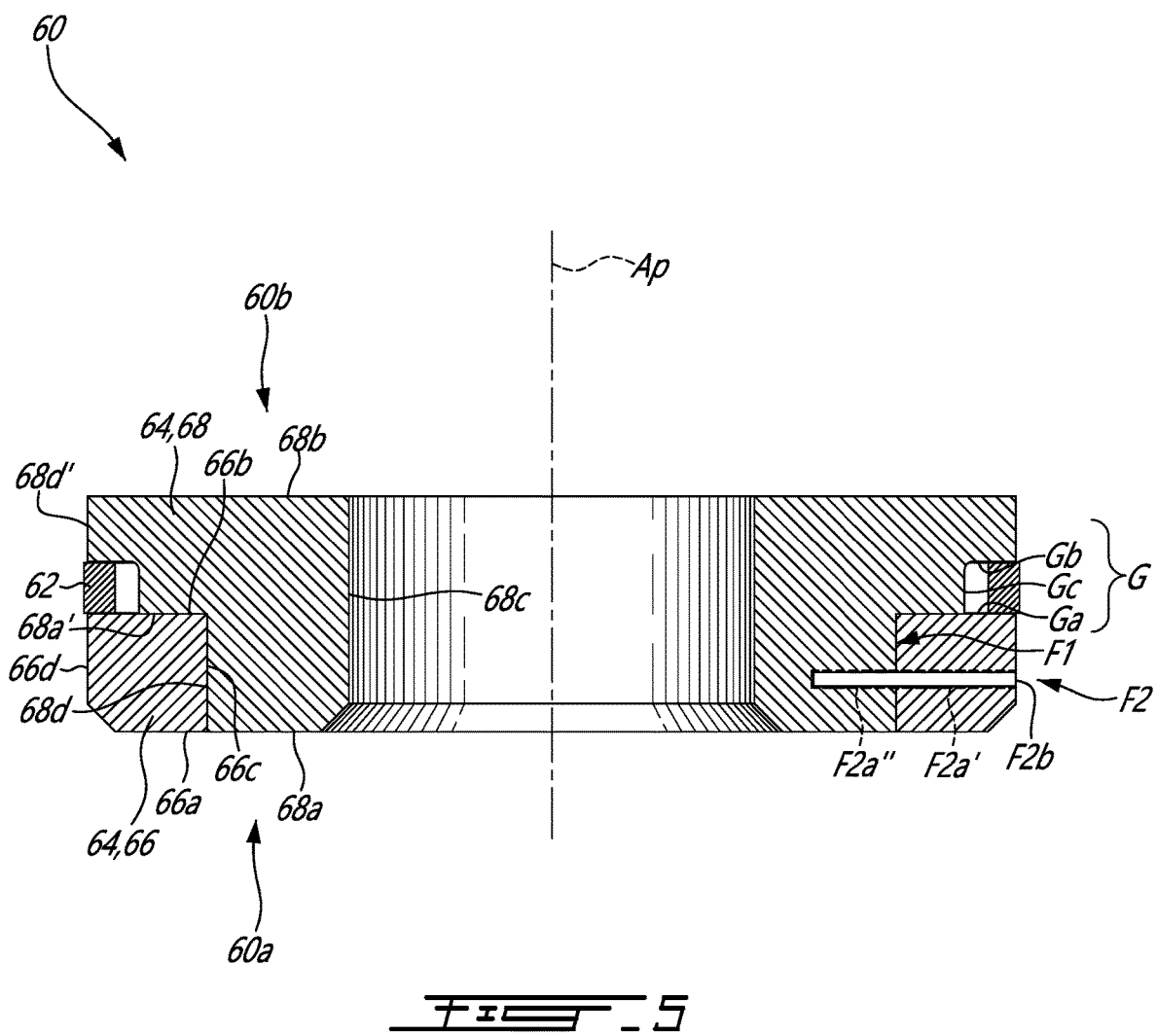
FIG. 5 is a cross-sectional view of a piston assembly of the valve of FIG. 2 according to embodiments.

Referring to FIGS. 4 and 5, the sealing ring 62 includes opposite first and second axial ring surfaces 62a, 62b, and radially inner and outer ring surfaces 62c, 62d extending axially therebetween. As best seen in FIG. 2, the sealing ring 62 is of the split ring type, which may facilitate radial contraction and/or expansion of the sealing ring 62. In the depicted embodiments, the sealing ring 62 has ends that are circumferentially spaced from one another and that have cross sections similar to a remainder of the sealing ring 62, defining a gap via which the sealing ring 62 may be traversed radially and axially. In other embodiments, the ends may instead define one or more tabs that overlap one another, defining a chicane, or non-linear path, in the axial direction from the first axial ring surface 62a to the second axial ring surface 62b. It is contemplated however that in some embodiments, the sealing ring 62 could be closed, i.e., uninterrupted. The sealing ring 62 may be constructed of a variety of suitable materials suitable for achieving its sealing function, including one or more of metal, carbon, etc.

The piston body 64 has opposite first and second axial piston surfaces 64a, 64b, and radially inner and outer piston surfaces 64c, 64d extending axially therebetween. The radially outer piston surface 64d is circumscribed by a piston diameter that is smaller than the sealing diameter. As mentioned above, the piston body 64 defines an annular groove G, which extends radially inwardly from the radially outer piston surface 64d. The annular groove G (hereinafter the groove G) is sized for receiving the sealing ring 62. Indeed, the sealing ring 62 extends radially inwardly relative to the piston axis $A_P$ from outside the groove G (i.e., outward of the piston diameter) to inside the groove G (i.e., inward of the piston diameter). The groove G has first and second groove walls Ga, Gb facing one another, and a groove bottom Gc extending axially between the first and second groove walls Ga, Gb (FIGS. 4, 5). In embodiments, the groove G is sized such that a radial gap is formed between the groove bottom Gc and the radially inner ring surface 62c. This radial gap may allow radial contraction of the sealing ring 62 unhindered by the piston body 64. For example, the sealing ring 62 may have an outer diameter that is greater than the sealing diameter of the chamber C and, in order to fit the sealing ring 62 into the chamber C, the sealing ring 62 may be radially contracted, bringing the radially inner ring surface 62c closer to the groove bottom Gc. Such radial contraction may be facilitated by the split configuration of the sealing ring 62. Moreover, such radial contraction may advantageously bias the radially outer ring surface 62d against the valve sealing surface 40a. When the piston assembly 60 is received inside the chamber C, the radially outer ring surface 62d is in radial engagement with the valve sealing surface 40a, thereby forming an axial seal partitioning the chamber C into high-pressure and low-pressure portions on either side of the sealing ring 62.

A height of the groove G (i.e., a distance between the first and second groove walls Ga, Gb) may generally correspond to a height of the sealing ring 62 (i.e., a distance between the first and second axial ring surfaces 62a, 62b). In embodiments, the groove G is sized such that the sealing ring 62 is axially loose relative to the piston body 64 (i.e., the height of the sealing ring 62 is less than that of the groove G). However, in such cases, as pressure is greater on the high-pressure side 60a than on the low-pressure side 60b of the piston assembly 60 (and hence of the sealing ring 62), the second axial ring surface 62b is biased against the second axial wall Gb of the groove G, thereby forming a radial seal preventing, or at least hindering, circumvention of the axial seal by fluid circulating in the chamber C.

It should be noted that the first and second axial walls Ga, Gb of the groove G are defined by the first and second members 66, 68 of the piston body 64. Hence, the groove G may be said to be split between the first and second members 66, 68 As such, prior to mating engagement between the first member 66 with the second member 68, each one of the first member 66 and the second member 68 may be said to define an axially open portion of the groove G, i.e., a portion of the groove G onto which the sealing ring 62 may be axially seated when assembling the piston assembly 60, after which the members 66, 68 may be matingly engaged to complete, or close, the groove G so as to axially constrain, or sandwich, the sealing ring 62 into the groove G. Alternatively, the sealing ring 62 may in some cases be radially expanded until the radially inner ring surface 62c defines a diameter greater than the piston diameter to allow slipping of the sealing ring 62 axially around the piston body 64 until the sealing ring 62 reaches the groove G, allowing the sealing ring 62 to elastically revert to its original shape as the radially inner ring surface 62c is received by the groove G. However, the sealing ring 62 may in some embodiments have certain dimensions and/or be constructed of certain materials having certain properties, by virtue of which sufficient elastic, reversible deformation of the sealing ring 62 is not possible. As such, it should be apparent to the reader that the multi-component, split-groove structural arrangement of the piston body 64 broadens the range of materials from which the sealing ring 62 may be constructed.

With reference to FIGS. 4 and 5, exemplary embodiments of the piston assembly 60 will be described in greater detail. The first member 66 extends axially relative to the piston axis $A_P$ from a first high-pressure end surface 66a to a first low-pressure end surface 66b. Inward relative to the piston axis $A_P$, the first member 66 has a radially inner surface 66c extending axially between the first high-pressure and low-pressure end surfaces 66a, 66b. Outward relative to the piston axis $A_P$, the first member 66 has a radially outer surface 66d extending axially between the first high-pressure and low-pressure end surfaces 66a, 66b.

The second member 68 extends axially relative to the piston axis $A_P$ from a second high-pressure end surface 68a to a second low-pressure end surface 68b. Inward relative to the piston axis $A_P$, the second member 68 has a radially inner surface 68c extending axially between the second high-pressure and low-pressure end surfaces 68a, 68b. Outward relative to the piston axis $A_P$, the second member 68 has a radially outer surface 68d extending axially between the second high-pressure and low-pressure end surfaces 68a, 68b.

The piston body 64 may be provided with one or more assembly features assisting in maintaining the mating engagement between the first and second members 66, 68. For example, a first assembly feature a may be a threaded interface and/or an interference fit defined by radially adjacent surfaces of the first and second members 66, 68, for example, depending on the embodiment, the radially outer surface 66d of the first member 66 and the radially inner surface 68c of the second member 68 (FIG. 4), or the radially outer surface 68d of the second member 68 and the radially inner surface 66c of the first member 66 (FIG. 5). The first assembly feature F1 may also include a thermal bond, such as welding or brazing. A thermal bond may for example be provided on the high-pressure side 60a and/or on the low-pressure side 60b of the piston assembly 60 at the junction between the radially inner surface 66c of the first member 66 and the radially outer surface 68d of the second member 68.

The piston body 64 may in some embodiments be provided with a second assembly feature F2 to supplement, and in some cases cooperate with, the first assembly feature F1 to assisting in maintaining the mating engagement between the first and second members 66, 68. The second assembly feature F2 may include a fastener engaging one or more of the members 66, 68 to hinder axial movement thereof relative to one another. In some embodiments, the members 66, 68 respectively define a first keyway and a second keyway in register with one another and extending transversely to the piston axis $A_P$, and the fastener is a pin extending from inside the first keyway to inside the second keyway. The keyways may in some cases be radially extending holes. The second assembly feature F2 may also include a thermal bond, such as welding or brazing.

The embodiment of FIG. 4 will now be described in more detail. The first member 66 has a bushing-like shape defined by a wide portion, or base, of the first member 66 defining the first high-pressure end surface 66a, and a narrow portion, or shank, of the first member 66 defining the first low-pressure end surface 66b and the radially outer surface 66d. The base has a radially outermost surface 66d' circumscribed by a diameter (in this case corresponding to the piston diameter) greater than that of the radially outer surface 66d. The base also has an axial surface 66b' facing axially opposite from the first high-pressure end surface 66a and extending radially between the radially outer surface 66d and the radially outermost surface 66d'. In this embodiment, the second member 68 surrounds the shank of the first member 66. The radially outer surface 66d of the first member 66 and the radially inner surface 68c of the second member 68 are radially adjacent and define the first assembly feature F1, in this case a threaded interface. The first groove wall Ga is defined by the axial surface 66b' of the first member 66, whereas the second groove wall Gb is defined by the second member 68. The groove bottom Gc is in this case defined solely by the second member 68, although in other embodiments the first and second members 66, 68 may each define a portion of the groove bottom Gc, or the groove bottom Gc may be defined solely by the first member 66. In the depicted embodiment, the shank of the first member 66 extends from the base to past the second low-pressure end surface 68b of the second member 68. The second assembly feature F2 in this case includes an annular groove F2a located axially between the first low-pressure end surface 66b and the second low-pressure end surface 68b, extending in the first member 66 radially inwardly from the radially outer surface 66d. The second assembly feature F2 also includes a fastener F2b provided in the form of a retaining ring that is received in the groove F2a, extending radially outwardly from inward of the radially outer surface 66d of the first member 66 to outward of the radially inner surface 68d of the second member 68. Alternatively, in other embodiments, the second assembly feature F2 may instead include the fastener F2b provided in the form of a nut threadedly engaging the radially outer surface 66d of the first member 66 and extending to radially outward of the radially inner surface 68d of the second member 68.

Figure 6:
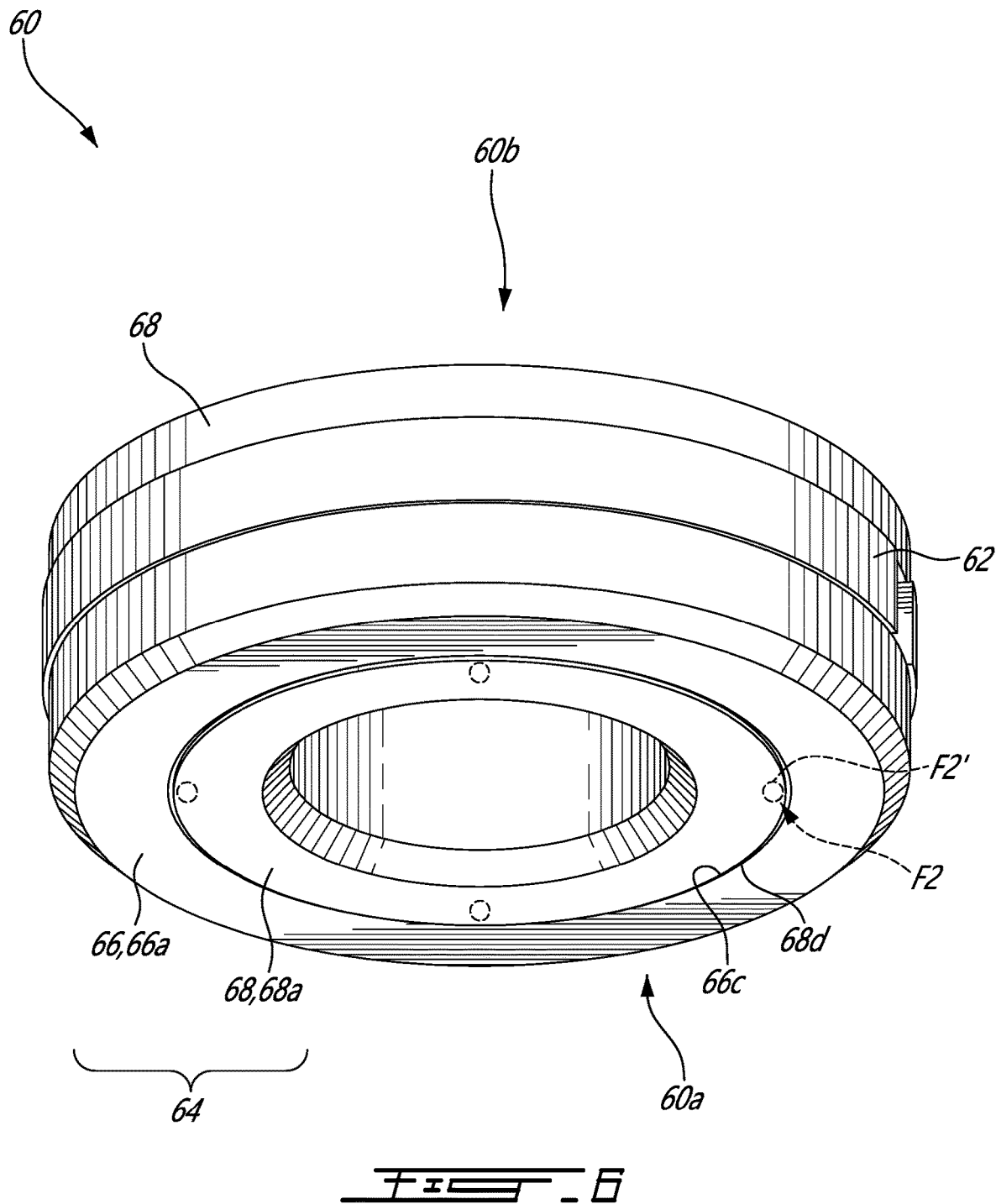
FIG. 6 is a perspective view of a piston assembly of the valve of FIG. 2 according to embodiments.

The embodiment of FIG. 5 will now be described in more detail. The second member 68 has a bushing-like shape defined by a wide portion, or base, of the second member 68 defining the second low-pressure end surface 68b, and a narrow portion, or shank, of the second member 68 defining the second high-pressure end surface 68a and the radially outer surface 68d. The base has a radially outermost surface 68d' circumscribed by a diameter (in this case corresponding to the piston diameter) greater than that of the radially outer surface 68d. The base also has an axial surface 68a' facing axially opposite from the second low-pressure end surface 68b and extending radially between the radially outer surface 68d and the radially outermost surface 68d'. In this embodiment, the first member 66 surrounds the shank of the second member 68. The radially outer surface 68d of the second member 68 and the radially inner surface 66c of the first member 66 are radially adjacent and define the first assembly feature F1, in this case an interference fit interface. Thus, the first and second members 66, 68 are sized such that, prior to assembly, a diameter of the radially outer surface 68d of the second member 68 is greater than a diameter of the radially inner surface 66c of the first member 66 by a suitable amount. Also, it should be noted that the first groove wall Ga is defined by the first member 66, whereas the second groove wall Gb is defined by the second member 68. The groove bottom Gc is in this case defined solely by the second member 68, although in other embodiments the first and second members 66, 68 may each define a portion of the groove bottom Gc, or the groove bottom Gc may be defined solely by the first member 66. In the depicted embodiment, the shank of the second member 68 extends from the base to an axial plane in which lays the first high-pressure end surface 66a of the first member 66. The first high-pressure end surface 66a and the second high-pressure end surface 68a are thus co-planar. The second assembly feature F2 in this case includes first and second keyways F2a', F2a" respectively defined in the first and second members 66, 68 both in register with one another and extending radially relative to the piston axis $A_P$. A fastener F2b provided in the form of a pin extends from inside the first keyway F2a' to inside the second keyway F2b'. As schematically shown in FIG. 6, the second assembly feature F2 may include localized interference fits, i.e., local deformations of the piston body 64 at interfaces between the first and second members 66, 68, for example on the high-pressure side 60a of the piston assembly 60 at the junction between the radially inner surface 66c of the first member 66 and the radially outer surface 68d of the second member 68. Such localized interference fits may be formed by staking, for example induced via peripheral location(s) F2' of the second high-pressure end surface 68a, causing the second member 68 to locally deform so as to impinge on the first member 66. The above is merely one of the several implementations of the localized interference fits that fall within the scope of the present technology. Depending on the implementation, the first member 66 and the second member 68 together define one or more localized interference fit which may be provided on the high-pressure side 60a and/or the low-pressure side 60b of the piston assembly 60, and may be induced via the first member 66 and/or via the second member 68 of the piston body 64. A location at which a localized interference fit is induced may have a shape that is punctual, linear (for example radial relative to the piston axis $A_P$) or curved (for example circumferential relative to the piston axis $A_P$) among others.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, embodiments of the present technology have been described hereinabove as implemented in an aircraft engine switching valve having a housing integral with an intercompressor case of the aircraft engine. It is contemplated however that the present technology may be implemented in other types of valve. Yet further modifications could be implemented by a person of ordinary skill in the art in view of the present disclosure, which modifications would be within the scope of the present technology.

The invention claimed is:

1. A valve for an air system in an aircraft engine, comprising:
   a piston housing defining a cylindrical chamber having a valve axis, the cylindrical chamber circumscribed by a sealing surface; and
   a piston assembly received within the chamber, the piston assembly including:
   a sealing ring; and
   a piston body extending annularly about a piston axis colinear with the valve axis, the piston body having a first axial piston surface and a second axial piston surface axially spaced apart, a radially outer piston surface extending axially and located between the first and second axial piston surfaces, and an annular groove extending radially inwardly from the radially outer piston surface, the annular groove having first and second axial groove walls spaced apart and axially facing one another, the sealing ring received within the annular groove, the piston body including:
   a first member defining the first axial piston surface and the first axial groove wall; and
   a second member defining the second axial piston surface and the second axial groove wall, the first member and the second member in mating engagement with one another, the second member extending axially from a second low-pressure end defined by the second axial piston surface to a second high-pressure end located axially past the second axial groove wall, and the second member defining a bottom of the annular groove extending axially from the first axial groove wall to the second axial groove wall.

2. The valve of claim 1, wherein the first member and the second member define a localized interference fit.

3. The valve of claim 1, wherein the first member extends axially from a first high-pressure end defined by the first axial piston surface to a first low-pressure end located axially past the first axial groove wall.

4. The valve of claim 3, wherein the first member defines a bottom of the annular groove extending axially from the first axial groove wall to the second axial groove wall.

5. The valve of claim 1, wherein the first member and the second member are thermally bonded to one another.

6. The valve of claim 1, further comprising a fastener engaged with one or more of the first member and the second member to hinder axial movement of the first and second members relative to one another.

7. The valve of claim 6, wherein the first and the second member respectively define a first keyway and a second keyway extending transversely to the piston axis, and the fastener extends from inside the first keyway to inside the second keyway.

8. The valve of claim 1, wherein the first axial piston surface and the second high-pressure end lay in a same axial plane.

9. A valve for an air system in an aircraft engine, comprising:
   a piston housing defining a cylindrical chamber having a valve axis, the cylindrical chamber circumscribed by a sealing surface; and
   a piston assembly received within the chamber, the piston assembly including:
   a sealing ring; and
   a piston body extending annularly about a piston axis colinear with the valve axis, the piston body having a first axial piston surface and a second axial piston surface axially spaced apart, a radially outer piston surface extending axially and located between the first and second axial piston surfaces, and an annular groove extending radially inwardly from the radially outer piston surface, the annular groove having first and second axial groove walls spaced apart and axially facing one another, the sealing ring received within the annular groove, the piston body including:
   a first member defining the first axial piston surface and the first axial groove wall; and
   a second member defining the second axial piston surface and the second axial groove wall, the first member and the second member in mating engagement with one another, the second member extending axially from a second low-pressure end defined by the second axial piston surface to a second high-pressure end located axially past the second axial groove wall, and wherein the first axial piston surface and the second high-pressure end lay in a same axial plane.

10. A valve for an air system in an aircraft engine, comprising:
    a piston housing defining a cylindrical chamber having a valve axis, the cylindrical chamber circumscribed by a sealing surface; and
    a piston assembly received within the chamber, the piston assembly including:
    a sealing ring; and
    a piston body extending annularly about a piston axis colinear with the valve axis, the piston body having a first axial piston surface and a second axial piston surface axially spaced apart, a radially outer piston surface extending axially and located between the first and second axial piston surfaces, and an annular groove extending radially inwardly from the radially outer piston surface, the annular groove having first and second axial groove walls spaced apart and axially facing one another, the sealing ring received within the annular groove, the piston body including:
    a first member defining the first axial piston surface and the first axial groove wall; and
    a second member defining the second axial piston surface and the second axial groove wall, the first member and the second member in mating engagement with one another;
    wherein a one of the first member and the second member has a radially outer surface and a remaining one of the first member and the second member has a radially inner surface surrounding the radially outer surface, the radially outer surface and the radially inner surface defining an interference fit or a threaded engagement; and
    wherein the second member extends axially from a second low-pressure end defined by the second axial piston surface to a second high-pressure end located axially past the second axial groove wall, and the first member and the second member define localized interference fits at a junction of the radially outer surface and the radially inner surface on a side of the piston body having the first axial piston surface.

11. The valve of claim 10, further comprising a retaining ring extending radially outwardly from inward of the radially outer surface to outward of the radially inner surface on a side of the piston body having the second axial piston surface.

12. An aircraft engine comprising:
a compressor including an intercompressor case defining a cylindrical chamber about a chamber axis, the chamber circumscribed by a sealing surface; and
a piston assembly received within the chamber, including:
a sealing ring conformable to the sealing surface; and
a piston body about a piston axis, the piston body having a first axial piston surface and a second axial piston surface facing axially opposite one another relative to the piston axis, a radially outer piston surface circumscribed by a piston diameter smaller than the sealing diameter, the radially outer piston surface extending axially between the first and second axial piston surfaces, and an annular groove extending radially inwardly from the radially outer piston surface and having first and second axial groove walls facing axially one another, the sealing ring received by the annular groove, the piston body including:
a first member defining the first axial piston surface and the first axial groove wall; and
a second member defining the second axial piston surface and the second axial groove wall, the first and the second members matingly engaged with one another;
wherein one of the first member and the second member has a radially outer surface and a remaining one of the first member and the second member has a radially inner surface surrounding the radially outer surface, the radially outer surface and the radially inner surface defining an interference fit or a threaded engagement, and the first member and the second member define localized interference fits at a junction of the radially outer surface and the radially inner surface on a side of the piston body having the first axial piston surface.

13. The aircraft engine of claim 12, wherein the first member and the second member are thermally bonded to one another.

14. The aircraft engine of claim 12, further comprising a fastener engaged with one or more of the first member and the second member to hinder axial movement of the first and second members relative to one another.

15. The aircraft engine of claim 14, wherein the first and the second member respectively define a first keyway and a second keyway extending transversely to the piston axis, and the fastener extends from inside the first keyway to inside the second keyway.

16. The aircraft engine of claim 12, further comprising a retaining ring extending radially outwardly from inward of the radially outer surface to outward of the radially inner surface on a side of the piston body having the second axial piston surface.

17. The aircraft engine of claim 12, wherein the second member extends axially from a second low-pressure end defined by the second axial piston surface to a second high-pressure end located axially past the second axial groove wall, and the second member defines a bottom of the annular groove extending axially from the first axial groove wall to the second axial groove wall.

18. The aircraft engine of claim 12, wherein the second member extends axially from a second low-pressure end defined by the second axial piston surface to a second high-pressure end located axially past the second axial groove wall, and the first axial piston surface and the second high-pressure end lay in a same axial plane.

* * * * *